(12) United States Patent
Ichiba et al.

(10) Patent No.: US 11,740,348 B2
(45) Date of Patent: Aug. 29, 2023

(54) APPARATUS AND METHOD FOR DETECTING OBJECTS

(71) Applicant: Furuno Electric Co., Ltd., Nishinomiya (JP)

(72) Inventors: Yuya Ichiba, Tokyo (JP); Hiroki Okubo, Nishinomiya (JP); Yoshifumi Nishitani, Amagasaki (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 210 days.

(21) Appl. No.: 17/105,274

(22) Filed: Nov. 25, 2020

(65) Prior Publication Data

US 2022/0163661 A1    May 26, 2022

(51) Int. Cl.
| | | |
|---|---|---|
| *G01S 13/91* | (2006.01) | |
| *G06V 40/20* | (2022.01) | |
| *G01S 7/22* | (2006.01) | |
| *G01S 13/58* | (2006.01) | |
| *G06F 18/22* | (2023.01) | |

(52) U.S. Cl.
CPC ............. *G01S 13/917* (2019.05); *G01S 7/22* (2013.01); *G01S 13/589* (2013.01); *G06F 18/22* (2023.01); *G06V 40/20* (2022.01)

(58) Field of Classification Search
None
See application file for complete search history.

(56) References Cited

U.S. PATENT DOCUMENTS

| | | | | |
|---|---|---|---|---|
| 2017/0067984 A1* | 3/2017 | Nakahama | ................ | G01S 7/10 |
| 2017/0097416 A1* | 4/2017 | Shiraki | .................... | G01S 15/89 |
| 2019/0204416 A1* | 7/2019 | Yanagi | .................... | G01S 7/043 |
| 2019/0391257 A1* | 12/2019 | Nakahama | ............. | G01S 13/89 |
| 2021/0088656 A1* | 3/2021 | Terada | .................... | G01S 15/96 |
| 2022/0043112 A1* | 2/2022 | Stokes | .................... | G01S 7/417 |

FOREIGN PATENT DOCUMENTS

| | | |
|---|---|---|
| EP | 3006956 A1 | 4/2016 |
| JP | 2003114267 A | 4/2003 |

OTHER PUBLICATIONS

European Patent Office, Extended European Search Report Issued in Application No. 21180365.5, dated Dec. 17, 2021, Germany, 8 pages.

* cited by examiner

*Primary Examiner* — Whitney Moore
(74) *Attorney, Agent, or Firm* — Alleman Hall Creasman & Tuttle LLP

(57) ABSTRACT

An apparatus for nautical tracking, where the apparatus detects at least one object. The apparatus further determines radar information associated with the at least one object, and calculates a first velocity vector associated with the at least one object. The apparatus further determines information associated with a tidal current of the water body, and calculates a second velocity vector based on the information associated with the tidal current. The apparatus further compares the first velocity vector and the second velocity vector in order to classify an object of the at least one object as a target, and further notifies a user of the target.

18 Claims, 5 Drawing Sheets

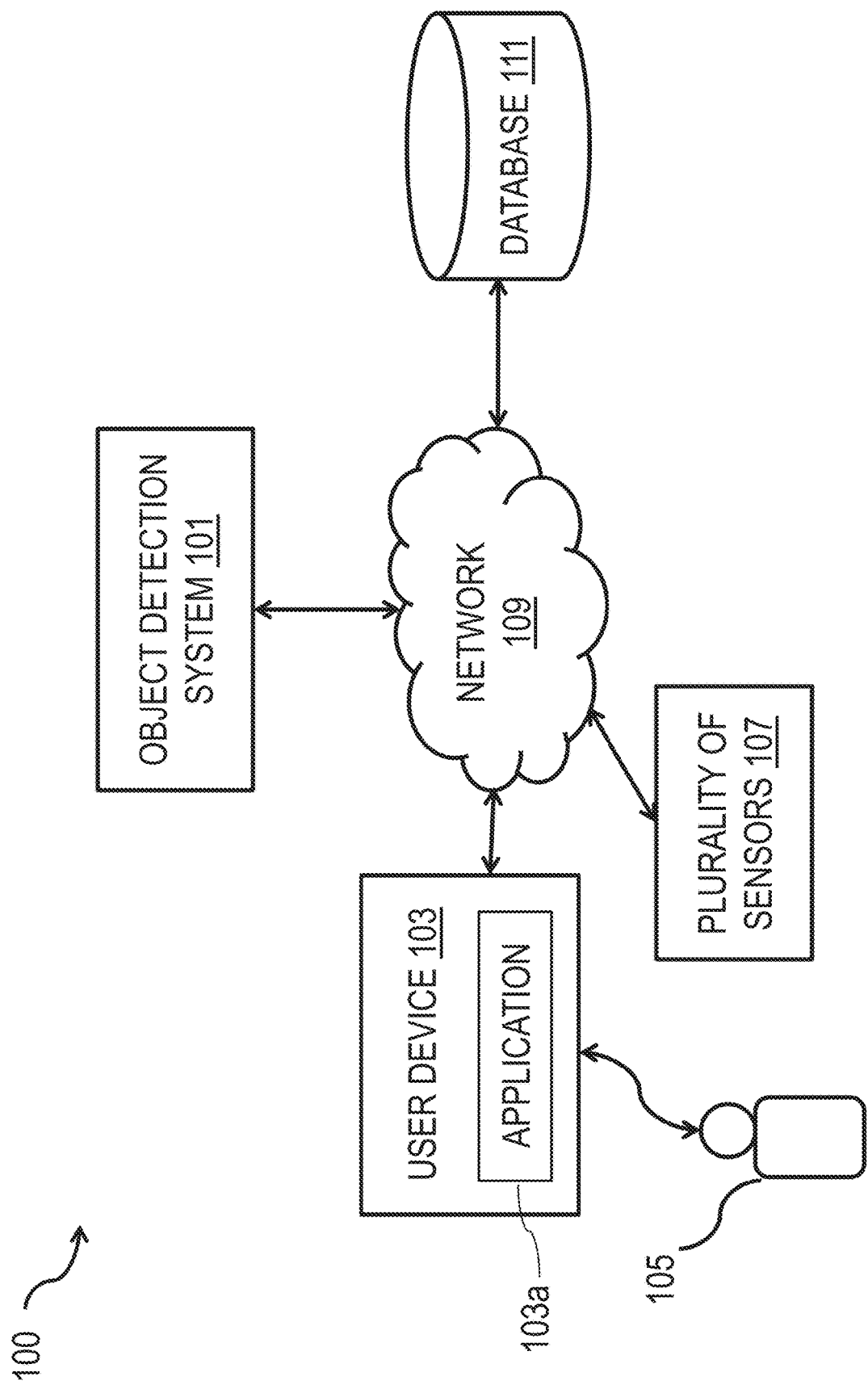

APPARATUS AND METHOD FOR DETECTING OBJECTS

TECHNICAL FIELD

An example embodiment of the present disclosure generally relates to an object detection apparatus used for detecting one or more objects in a water body.

BACKGROUND

With advancements in the field of marine radar technology, nowadays marine radars are used for a number of marine activities. For example, the marine radars are used in surveillance systems to detect objects such as planes, icebergs, or the like located very far away from the vessel. Further, the marine radar obtains useful information associated with the detected objects such as speed of the object, location of the object, or the like. Conventionally, the user has to place an origin mark near an obtained object to determine the positional relationship between the origin mark and the object over a period of time. The origin mark moves according to the speed of a tidal current of the water body. The object is determined to be a stationary object when the positional relationship is unchanged, and the object is determined to be a moving object when there is a change in the positional relationship. However, the current method for determining the positional relationship is uneconomical, laborious, and time consuming, as inserting the origin mark every time an object is obtained requires more time and additional cost. Further, if the origin mark is not inserted, determining whether the object obtained by a radar is a moving object or a stationery object becomes difficult for the user.

The prior art document JP2003-114267A relates to a suspicious object detection device. The device detects suspicious objects having radio antennas which are dropped on water. The device includes a direction finder that detects an object (a ship or a suspicious object) in a search sea area, by transmitting electric waves. The device further includes a radar device that searches for the suspicious object in the search sea area. The suspicious object is determined by eliminating objects detected by the radar device from objects detected by the direction finder. However, the suspicious object detection device has a limitation in that the device is able to detect the objects on water only when the objects have radio antennas. The device is unable to detect objects that are without any identification hardware.

Accordingly, there is a need of an object detection apparatus and method that can automatically and efficiently detect one or more moving objects that are without any identification hardware based on the positional relationship between the at least one object and the tidal current.

SUMMARY

In order to solve the foregoing problem, the present invention provides an apparatus for nautical tracking. The apparatus comprises processing circuitry configured to detect at least one object in or adjacent a water body by a radar, determine radar information associated with the at least one object; and calculate a first velocity vector for each object of the at least one object, based on the radar information associated with the at least one object. The processing circuitry is further configured to obtain information associated with a tidal current of the water body and calculate a second velocity vector, based on the information associated with the tidal current. The processing circuitry is further configured to compare the first velocity vector and the second velocity vector to classify an object of the at least one object as a target, and notify a user of the target.

According to some example embodiment, in order to notify the user, the processing circuitry is further configured to display on a display, a mark associated with the target that is moving along with the tidal current, based on a similarity between the first velocity vector associated with the target and the second velocity vector.

According to some example embodiment, the processing circuitry is further configured to determine a type of the at least one object, and wherein the type of the at least one object is at least one of a stationary object, an object moving in a direction with the tidal current, or an object moving in a direction independent of the tidal current.

According to some example embodiment, in order to classify the target, the processing circuitry is further configured to generate a similarity value between the first velocity vector and the second velocity vector.

According to some example embodiment, the processing circuitry is further configured to determine the similarity value based on at least one of: an inner product of the first velocity vector and the second velocity vector; and a difference between the first velocity vector and the second velocity vector.

According to some example embodiment, the information associated with the tidal current comprises at least one of a speed of the tidal current and a direction of the tidal current, and wherein the radar information associated with the at least one object comprises at least one of a speed of the at least one object and a direction in which the at least one object is moving.

According to some example embodiment, to display the target, the processing circuitry is further configured to: generate one or more display signals associated with the at least one object; and change the one or more display signals based on a similarity between the first velocity vector associated with the at least one object and the second velocity vector associated with the tidal current.

According to some example embodiment, the processing circuitry is further configured to use one or more colors for displaying the target, based on the similarity between the first velocity vector associated with the target and the second velocity vector.

According to some example embodiment, the processing circuitry is further configured to change the one or more display signals based on a change in distance of the target.

According to an example embodiment, a method is provided for nautical tracking, the method comprising: detecting at least one object in or adjacent a water body by a radar. The method further comprises determining radar information associated with the at least one object; and calculating a first velocity vector for the at least one object, based on the radar information associated with the at least one object. The method further comprises obtaining information associated with a tidal current of the water body; and calculating a second velocity vector, based on the information associated with the tidal current. The method further comprises comparing the first velocity vector and the second velocity vector to classify an object of the at least one object as a target; and notifying a user of the target.

According to an example embodiment, for notifying the user, the method further comprises displaying on a display, a mark associated with the target that is moving along with the tidal current, based on a similarity between the first velocity vector associated with the target and the second velocity vector.

According to an example embodiment, the method further comprises determining a type of the at least one object, and wherein the type of the at least one object is at least one of a stationary object, an object moving in a direction with the tidal current, or an object moving in a direction independent of the tidal current.

According to an example embodiment, for classifying the target, the method further comprises generating a similarity value between the first velocity vector and the second velocity vector.

According to some example embodiment, the method further comprises determining the similarity value based on at least one of: an inner product of the first velocity vector and the second velocity vector; and a difference between the first velocity vector and the second velocity vector.

According to an example embodiment, the information associated with the tidal current comprises at least one of a speed of the tidal current and a direction of the tidal current, and the radar information associated with the at least one object comprises at least one of a speed of the at least one object and a direction in which the at least one object is moving.

According to an example embodiment, where for displaying the target, the method further comprises: generating one or more display signals associated with the at least one object; and changing the one or more display signals based on a similarity between the first velocity vector associated with the at least one object and the second velocity vector associated with the tidal current.

According to an example embodiment, the method further comprises using one or more colors for displaying the target based on the similarity between the first velocity vector and the second velocity vector.

According to an example embodiment, the method further comprises changing the one or more display signals based on a change in distance of the target.

According to an example embodiment, a system for nautical tracking comprises: memory configured to store instructions; and processing circuitry configured to execute the instructions to: detect at least one object by a radar. The processing circuitry is further configured to determine radar information associated with the at least one object; and calculate a first velocity vector for the at least one object, based on the radar information associated with the at least one object. The processing circuitry is further configured to obtain information associated with a tidal current of the water body; calculate a second velocity vector, based on the information associated with the tidal current; compare the first velocity vector and the second velocity vector to classify an object of the at least one objects as a target; and notify a user of the object.

According to an example embodiment, in order to notify the user, the processing circuitry is configured to execute the instructions to display on a display, a mark associated with the target that is moving along with the tidal current, based on a similarity between the first velocity vector associated with the target and the second velocity vector.

The foregoing summary is illustrative only and is not intended to be in any way limiting. In addition to the illustrative aspects, embodiments, and features described above, further aspects, embodiments, and features will become apparent by reference to the drawings and the following detailed description.

According to this disclosure, an apparatus, a system, and a method for detecting one or more objects in a water body may be provided.

BRIEF DESCRIPTION OF THE DRAWINGS

The present disclosure is illustrated by way of example and not by way of limitation in the figures of the accompanying drawings, in which like reference numerals indicate like elements and in which:

FIG. 1A is a schematic diagram that exemplarily illustrates a working environment of an object detection system for detecting one or more objects in a water body, in accordance with an example embodiment;

DETAILED DESCRIPTION

Figure 1B:
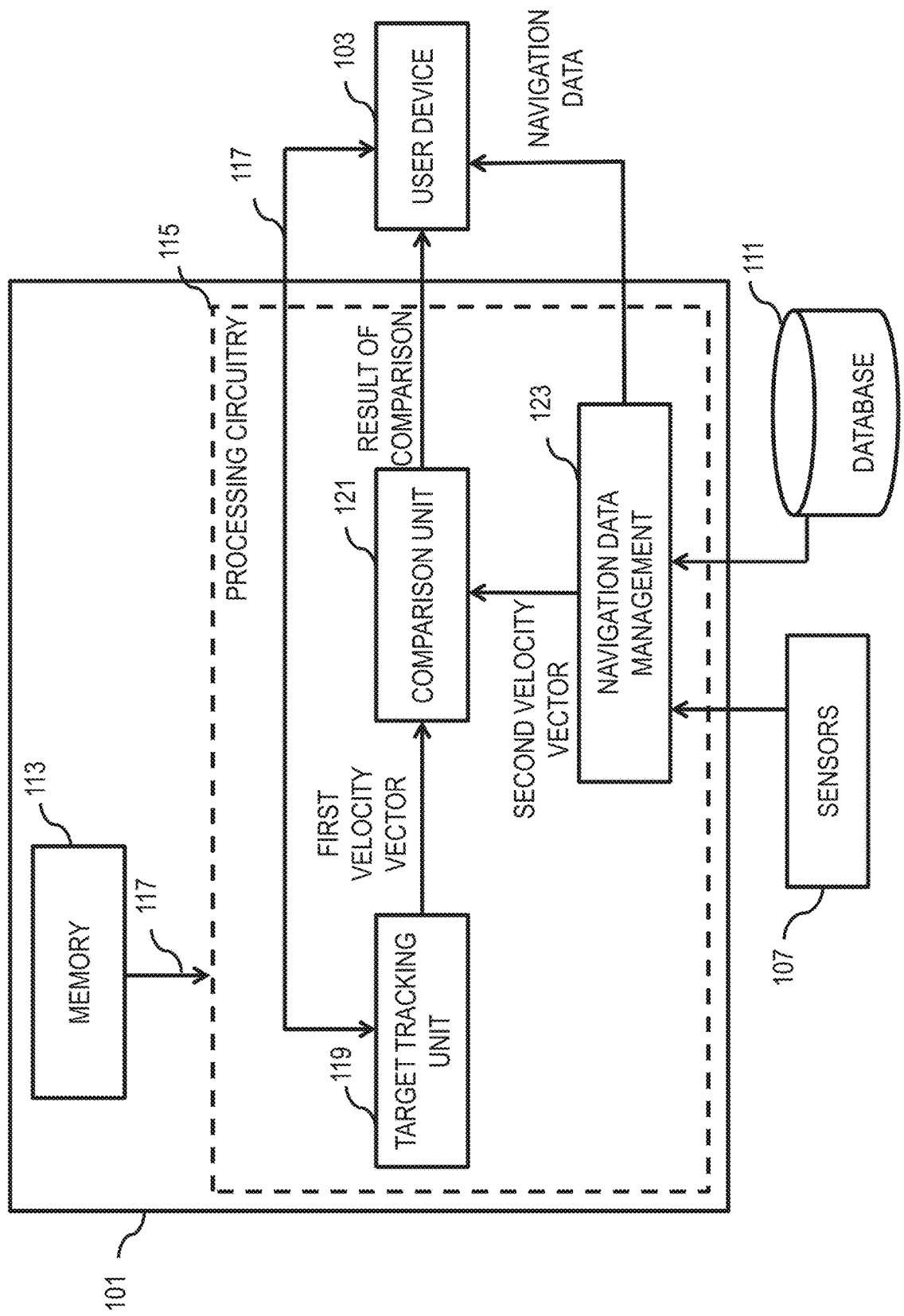
FIG. 1B illustrates a block diagram of the system, exemplarily illustrated in FIG. 1A, for detecting the one or more objects, in accordance with an example embodiment of the present disclosure.

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, and/or stored in accordance with embodiments of the present invention. Further, the terms "processor," "controller," and "processing circuitry" and similar terms may be used interchangeably to refer to the processor capable of processing information in accordance with embodiments of the present invention. Further, the terms "electronic equipment," "electronic devices," and "devices" are used interchangeably to refer to electronic equipment monitored by the system in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

As used in this specification and claims, the terms "for example," "for instance," and "such as," and the verbs "comprising," "having," "including" and their other verb forms, when used in conjunction with a listing of one or more components or other items, are each to be construed as open ended, meaning that that the listing is not to be considered as excluding other, additional components or items. Other terms are to be construed using their broadest reasonable meaning unless they are used in a context that requires a different interpretation.

One of the objectives of the present disclosure is to detect one or more objects, e.g., a school of fish in a water body based on an object such as a seabird chasing the one or more schools of fish. To that end, the present disclosure proposes an object detection system that may be installed on a vessel, where the system detects one or more objects in a water body. The one or more objects may be a school of fish in the water body. To detect the one or more objects, the object detection system detects at least one object by a radar and determines radar information associated with the detected at least one object. The object corresponds to the seabird chasing the one or more school of fish. The system further determines information associated with tidal current of a water body, and compares the information associated with the tidal current with the information associated with the detected at least one object to determine a type of the detected at least one object. The type of the detected at least one object may comprise at least one of: an object moving along the tidal current, a stationary object, and an object moving irrespective of the tidal current. When the detected at least one object is determined to be moving with the same speed and in the same direction as that of the tidal current, it may be determined that the detected at least one object is chasing the one or more school of fish that usually swim along with the tidal current of the water body. In this way, the system enables the user (for example, a fisherman) to estimate presence of the one or more school of fish at a larger distance range than a conventional fish finder system whose range is limited to a shorter distance, and thus, increases the efficiency of catching fish.

Further, on determining the type of the detected at least one object, the object detection system further indicates the different types of the detected at least one object on a display screen such that the different types of the detected at least one object are visually distinguishable by a user operating the object detection system. For example, the different types of the detected at least one object may be indicated on the display screen with different colors or different frames. By visually distinguishing the representation of the different types of the detected at least one object, the user may easily identify which of the detected at least one object is an object moving with the same speed and in the same direction as that of the tidal current, a stationary object, and an object flowing irrespective of the tidal current and may even obtain a location (e.g., longitude and latitude) of the detected at least one object. A detailed analysis of the system used for detecting the one or more objects in the water body is provided below with reference to FIG. 1A and FIG. 1B.

FIG. 1A is a schematic diagram that exemplarily illustrates working environment 100 of an object detection system 101 for detecting one or more objects in a water body, in accordance with an example embodiment. In an example embodiment, the system 101 may be installed at a vessel navigating in the water body. The system 101 may comprise a radar that is used to detect at least one object in an atmosphere around the vessel. The system 101 may further obtain radar information associated with the detected at least one object. Further, the one or more objects in the water body may be one or more school of fish that fishermen want to catch. The system 101 may be communicatively coupled with a user device 103, a plurality of sensors 107, and a database 111, via a network 109.

The user device 103 may comprise an application 103*a* installed in it, where the application 103*a* displays different information associated with the detected one or more objects for a user 105 operating the user device 103. The user device 103 may be any user accessible device such as a smartphone, a portable computer, a display unit, or the like. The user device 103 may comprise a processor, memory, and a communication interface. The processor, the memory and the communication interface may be communicatively coupled to each other.

Further, the plurality of sensors 107 may be used to determine tidal currents. In an example embodiment, the plurality of sensors 107 may be a current indicator that may determine speed and direction of tidal currents of the water body. In another example embodiment, the plurality of sensors 107 may be an ultrasonic sensor installed in the vessel to transmit ultrasound waves under water, and further configured to receive echoes corresponding to the transmitted ultrasound waves. The plurality of sensors 107 may determine information associated with the tidal currents such as speed and direction of the tidal currents based on the obtained echoes.

Further, the database 111 may store the latest information about the weather forecast, information about the tidal currents, and nautical charts that may be used by the vessel for navigating in the water body and to determine location of the detected one or more objects. The database 111 may further comprise dangerous locations in the water body such as location of a whirlpool or the like. The database 111 may comprise navigation data such as information on salinity, water temperature and air temperature, atmospheric pressure, and wind (speed, gusts, and direction), geographical location (in terms of longitude and latitude) of the vessel, or the like.

The network 109 may comprise suitable logic, circuitry, and interfaces that may be configured to provide a plurality of network ports and a plurality of communication channels for transmission and reception of data, such as the information associated with the tidal current, radar information associated with detected object, or the like. Each network port may correspond to a virtual address (or a physical machine address) for transmission and reception of the communication data. For example, the virtual address may be an Internet Protocol Version 4 (IPv4) or an IPv6 address and the physical address may be a Media Access Control (MAC) address. The network 109 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or BLUETOOTH (BT) communication protocols.

Examples of the network 109 may include, but is not limited to a wireless channel, a wired channel, and a combination of wireless and wired channel. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) network, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

FIG. 1B illustrates a block diagram of the system 101, exemplarily illustrated in FIG. 1A, for detecting the one or more objects, in accordance with an example embodiment of the present disclosure. As can be observed from the FIG. 1B, the system 101 may include processing circuitry 115 configured to execute stored instructions, as well as memory 113 that stores instructions that are executable by the processing circuitry 115. The memory 113 can include random access memory (RAM), read only memory (ROM), flash memory, or any other suitable memory systems. The processing circuitry 115 may be connected through a bus 117 to the memory 113.

The processing circuitry 115 includes a target tracking unit 119, a comparison unit 121, and a navigation data management unit 123. Further, different components of the processing circuitry 115 are connected to the user device 103, the plurality of sensors 107, and the database 111, via the network 109. The target tracking unit 119 is configured to detect the at least one object. The target tracking unit 119 may comprise a transceiver that is used to transmit and receive radio signals. The reflected signal, i.e. echoes, corresponding to the transmitted radio signals, from the detected at least one object, will be received by the transceiver. The target tracking unit 119 may then determine radar information associated with the detected at least one object based on the echoes.

The radar information may comprise a speed of the detected at least one object, a location of the detected at least one object, and a direction in which the detected at least one object is traveling. The target tracking unit 119 further calculates a first velocity vector associated with the detected at least one object based on the radar information. In an example embodiment, the target tracking unit 119 may be a radar device transmitting radar signals to detect the at least one target in the atmosphere around the vessel.

In an example embodiment, the target tracking unit 119 detects a stationary object such as a light house located in the south direction and at a distance of 3 km from the vessel. Further, the target tracking unit 119 detects another object, for example, a seabird at a distance of 5 km from the vessel and flying with a speed of 6 km/hr in the north direction. Then the first velocity vector for the detected objects may be expressed as:

$$\text{First velocity vector} = \begin{bmatrix} 0, S, 3 \\ 6, N, 5 \end{bmatrix} \quad (1)$$

where the first row of the first velocity vector represents speed, direction, and distance, corresponding to the detected stationary object, and the second row represents speed, direction, and distance, corresponding to the seabird. Further, in order to determine the type of the detected at least one target, it is required to obtain information associated with the tidal current.

To that end, the processing circuitry 115 is further configured to use the plurality of sensors 107 configured to determine the speed and direction of the tidal current. In an example embodiment, the plurality of sensors 107 may correspond to a tidal current indicator installed in a vessel to determine information associated with the tidal current. In another example embodiment, the plurality of sensors 107 may correspond to an acoustic Doppler current profiler (ADCP) installed in the vessel to determine information associated with the tidal current. The plurality of sensors 107 use the working principle of the Doppler Effect to measure the vertical distribution of speed of the water as well as the direction of the current. The ultrasound waves may be transmitted at a constant frequency through the water body. Echoes corresponding to the transmitted ultrasound waves, reflected from the particles suspended in the moving water may be received by the plurality of sensors 107. Since the particles move at the same speed as the water that carries them, the echoes received from the particles may be used to determine information associated with the tidal current of the water body.

In an example embodiment, the plurality of sensors 107 may comprise four acoustic transducers that transmit the ultrasound waves or acoustic pulses and receive reflected acoustic pulses from four different directions. The plurality of sensors 107 may be referred as the tidal current indicator. The tidal current indicator determines the current direction based on the received acoustic pulses. The tidal current indicator may convert the current direction to earth coordinates, by using trigonometric relationships. As the transmitted acoustic pulses extend from the vessel down to the bottom of the water body, the tidal current indicator can measure the tidal current at different depths simultaneously. As a consequence, the velocity and current direction can be determined from the surface to the bottom of the water body.

In another embodiment, the tidal current indicator may be configured to use a low ultrasonic frequency to measure the speed of the vessel relative to the bottom of the water body. The speed of the vessel may be subtracted from the determined tidal current to obtain more accurate measurements of the information associated with the tidal current such as velocities of the tidal current. The information associated with the tidal current may also comprise the direction of the tidal current. Further, the tidal current indicator provides the information associated with the tidal current to the navigation data management unit 123 of the processing circuitry 115.

The navigation data management unit 123 obtains information associated with the tidal current. The navigation data management unit 123 further obtains weather data from the database 111 and may use the weather data in real time to accurately determine or update the information associated with the tidal current, e.g., the speed and the direction of the tidal current. In an example embodiment, the navigation data management unit 123 may obtain the information associated with the tidal current directly from the database 111. However, it is possible that the information obtained from the database 111 may not be as accurate as the information obtained from the plurality of sensors 107 (or the tidal current indicator). Further, the navigation data management unit 123 calculates a second velocity vector based on the information associated with the tidal current.

In an example embodiment, assume that the plurality of sensors 107 and the navigation data management unit 123 have determined information associated with the tidal current up to a depth of 3 km from the surface of the water body. Let the tidal currents have a speed of 10 km/hr at a depth of 2 km and be moving in the north direction. Further, the tidal current has a speed of 6 km/hr at a depth of 3 km and the current is headed in the north direction. Then the second velocity vector may be expressed as:

$$\text{Second velocity vector} = \begin{bmatrix} 10, N, 2 \\ 6, N, 3 \end{bmatrix} \quad (2)$$

where the first row represents a first tidal current flowing at the speed of 10 km/hr toward the north direction at a depth of 2 km. Similarly, the second row represents a second tidal current flowing at the speed of 6 km/hr flowing toward the north direction at a depth of 3 km.

Further, the navigation data management unit 123 determines navigation data and provides it to the user device 103. The navigation data may be used by the user device 103 to prepare a map and indicate different types of the detected at least one target at their corresponding positions in the map. The navigation data may comprise nautical charts that provide basic navigation information such as depth of the water body and dangerous locations such as whirlpool or the like in the water body. The navigation data may further comprise information on salinity, water and air temperature, atmospheric pressure, and wind (speed, gusts, and direction), geographical location (in terms of longitude and latitude) of the vessel, or the like.

The processing circuitry 115 is further configured to use the comparison unit 121 to determine the type of the detected at least one object. To that end, the comparison unit 121 is configured to compare the speed and the direction of the detected at least one object with the speed and the direction of the tidal current. Based on the comparison, the comparison unit 121 may determine whether the detected at least one object is moving in the same direction and with the same speed of the tidal current or not. Further, the comparison unit 121 may also determine whether the detected at least one object is stationary with respect to the tidal current or moving in a direction independent of the tidal current.

To that end, the comparison unit 121 obtains the first velocity vector associated with the detected at least one object, and the second velocity vector associated with the tidal current of the water body. The processing circuitry 115 is further configured to use the comparison unit 121 to compare the first velocity vector and the second velocity vector and generate a similarity value between the first velocity vector and the second velocity vector. In another embodiment, the similarity value may be a vector that may be generated using:

$$\text{Similarity} = \frac{V_1 \cdot V_2}{|V_1||V_2|} \quad (3)$$

where $V_1$ is the velocity of the detected at least one object and $V_2$ is the velocity of the tidal current.

The comparison unit 121 is further configured to determine the type of the detected at least one object based on the similarity value between the first velocity vector and the second velocity vector. The similarity value between the first velocity vector and the second velocity vector is determined by calculating the inner product of the first velocity vector and the second velocity vector as described in equation (3) above. In another embodiment, the similarity may be determined by calculating the difference between the speed and direction of the first velocity vector and the second velocity vector. To that end, a speed threshold value and a direction threshold value may be predetermined or dynamically configured based on the tidal currents. When the difference between speeds of the first velocity vector and the second velocity vector is less than or equal to the predetermined speed threshold, the detected at least one object corresponding to the first velocity vector is determined to be moving with the same speed as that of the velocity of the tidal current. On the other hand, when the difference between speeds of the first velocity vector and the second velocity vector is greater than the predetermined speed threshold, the detected at least one object corresponding to the first velocity vector is determined to be moving with a speed different from that of the velocity of the tidal current.

Similarly, when the difference between the directions of the first velocity vector and the second velocity vector is less than or equal to a threshold degree (for example, in the azimuth plane), the detected at least one object is determined to be moving in the same direction as that of the tidal current. On the other hand, when the difference between the directions of the first velocity vector and the second velocity vector is greater than the threshold degrees (for example, in the azimuth plane), the detected at least one object is determined to be moving in a direction different than that of the tidal current.

In an example embodiment, when the detected at least one object (for example, a group of seabirds) is determined to be moving in the same direction and with the same speed as that of the tidal current, the one or more objects such as a school of fish are determined to be present at the location of the detected at least one object (for example, at the location where the group of seabirds are flying or chasing the school of fish). Further, the comparison unit 121 provides the result of the comparison to the user device 103. The user device 103 is used to provide visual information associated with the detected at least one object and/or tidal current, where the information may be location of the detected at least one object, type of the detected at least one object, speed of the detected at least one object, speed and direction of the tidal current, or the like. The user device 103 may comprise a liquid crystal display (LCD) screen, light emitting diode (LED) screen, cathode ray tube (CRT) screen, or the like to display the visual information.

The user device 103 comprises the application 103*a* installed in it, where the application 103*a* may be used by the user device 103 to generate one or more display signals associated with the detected at least one object, and to change the one or more display signals based on the similarity value between the first velocity vector and the second velocity vector. In an example embodiment, the user device 103 may change the one or more display signals based on the similarity vector. Changing the one or more display signal may correspond to changing a color of the detected at least one object based on the similarity vector. Using the one or more display signals for different types of the detected at least one object, enables the user 105 to distinguish between different types of the detected at least one object such as stationary objects or moving objects.

In another embodiment, the user device 103 is configured to use one or more colors for displaying the detected at least one object, based on the similarity between the first velocity vector associated with the detected at least one object and the second velocity vector. In an example embodiment, the user device 103 is further configured to change display of the detected at least one object on the display screen based on change in distance of the detected at least one object.

In another embodiment, the system 101 may be comprised of an apparatus, where the apparatus for detecting one or more objects in water body may comprise processing circuitry configured to detect at least one object, wherein the at least one object is different from the one or more objects in the water body. The processing circuitry obtains radar information associated with the detected at least one object. The processing circuitry is further configured to calculate a first velocity vector based on the radar information associated with the detected at least one object. Further, the processing circuitry is configured to determine information associated with a tidal current of the water body, calculate a second velocity vector based on the information associated with the tidal current, compare the first velocity vector and the second velocity vector to detect the one or more objects, and further, notify a user 105, based on the detected one or more objects.

Figure 2:
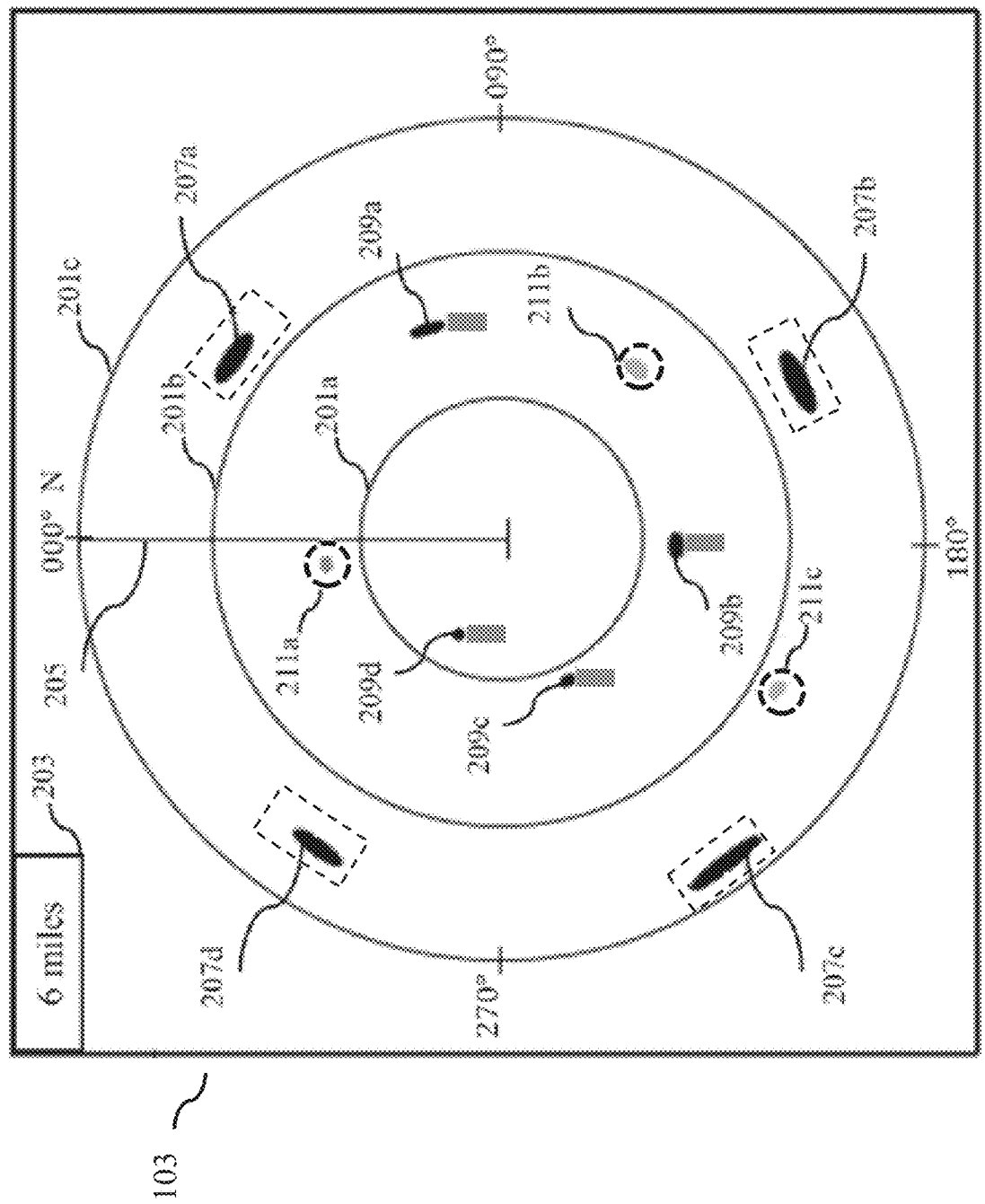
FIG. 2 is a schematic that illustrates a display screen of the display unit, in accordance with an example embodiment.

FIG. 2 is a schematic that illustrates a display screen of the user device 103, in accordance with an example embodiment. The display screen illustrated here is exemplary and is used in order to better understand the present disclosure. The display screen should not be considered limiting the scope of the disclosure. The display screen comprises concentric range rings 201*a*, 201*b*, and 201*c*, a range scale field 203, a heading line 205, stationary objects 207*a*, 207*b*, 207*c*, and 207*d*, objects 209*a*, 209*b*, 209*c*, and 209*d* moving with the same speed and in the same direction as that of the tidal current, and objects 211*a*, 211*b*, and 211*c* moving in a direction independent of the tidal current, i.e., the objects 211*a*, 211*b*, and 211*c* are moving in a direction different from the tidal current. Depending on the prevailing circumstances and conditions of the environment, appropriate range scale field may be selected. In the FIG. 2, the system 101 detects the one or more objects in the range scale of 6 miles which is indicated in the range scale field 203, and each fixed concentric range ring 201*a*-201*c* is predetermined at an interval of 2 miles. The outer concentric range ring 201*c* further represents azimuthal angles in degrees. The concentric range rings 201*a*-201*c* provide the location of the detected objects with respect to a vessel, comprising the system 101, which is assumed at the center of the display screen.

Further, the display screen uses the heading line 205, where the heading line 205 extends from the center to the outer edge and the heading line 205 marks the dead ahead direction of the vessel at the moment. In some embodiments, the heading line 205 may point in the direction in which the vessel is headed and may rotate on the screen as the vessel turns to a new course. In another embodiment, the heading line 205 is temporarily hidden to look for weak objects dead ahead. The display screen further indicates detected objects along with their locations. Further, based on the similarity between the first velocity vector and the second velocity vector, the different types of the detected at least one object is indicated on the screen such that the different types of the detected objects can be visually distinguished by the user 105. To that end, the user device 103 may represent different types of the objects using different colors or different frames around the detected different types of the objects. As can be observed in the FIG. 2, the screen displays the detected stationary objects 207*a*-207*d* with a square frame around the objects 207*a*-207*d*. The user 105 can easily distinguish the stationary objects 207*a*-207*d* by looking at the screen. Further, the user 105 can determine location of the stationary objects 207*a*-207*d*. For example, the stationary object 207*a* is located at approximately 2.2 miles from the vessel. Further, the objects 209*a*-209*d* that are moving with the same speed and in the same direction as that of the tidal current are indicated on the screen without any frame around them. Similarly, the objects 211*a*-211*c* moving in the direction independent of the tidal current are indicated on the screen with a circular frame around the objects 211*a*-211*c*. In another embodiment, the different types of the objects may be displayed on the display screen with different colors.

In an example embodiment, the processing circuitry 115 is configured to display on the display, a mark associated with the at least one object moving along with the tidal current, that is determined to have the same speed and direction as that of the tidal current (i.e., drifting objects). The mark enables the user 105 to distinguish drifting objects from the stationary object. The mark may be changed based on the similarity value between the first velocity vector associated with the detected objects that are flowing along with the tidal current and the second velocity vector.

In another embodiment, the processing circuitry 115 is configured to display a cursor (not shown in Figure) on the display screen of the user device 103 such that the user 105 is able to move the cursor to different points in the nautical chart. Further, the processing circuitry 115 is configured to display the distance and the azimuth between the object and the cursor when the object has the same speed and direction of the tidal current.

Figure 3:
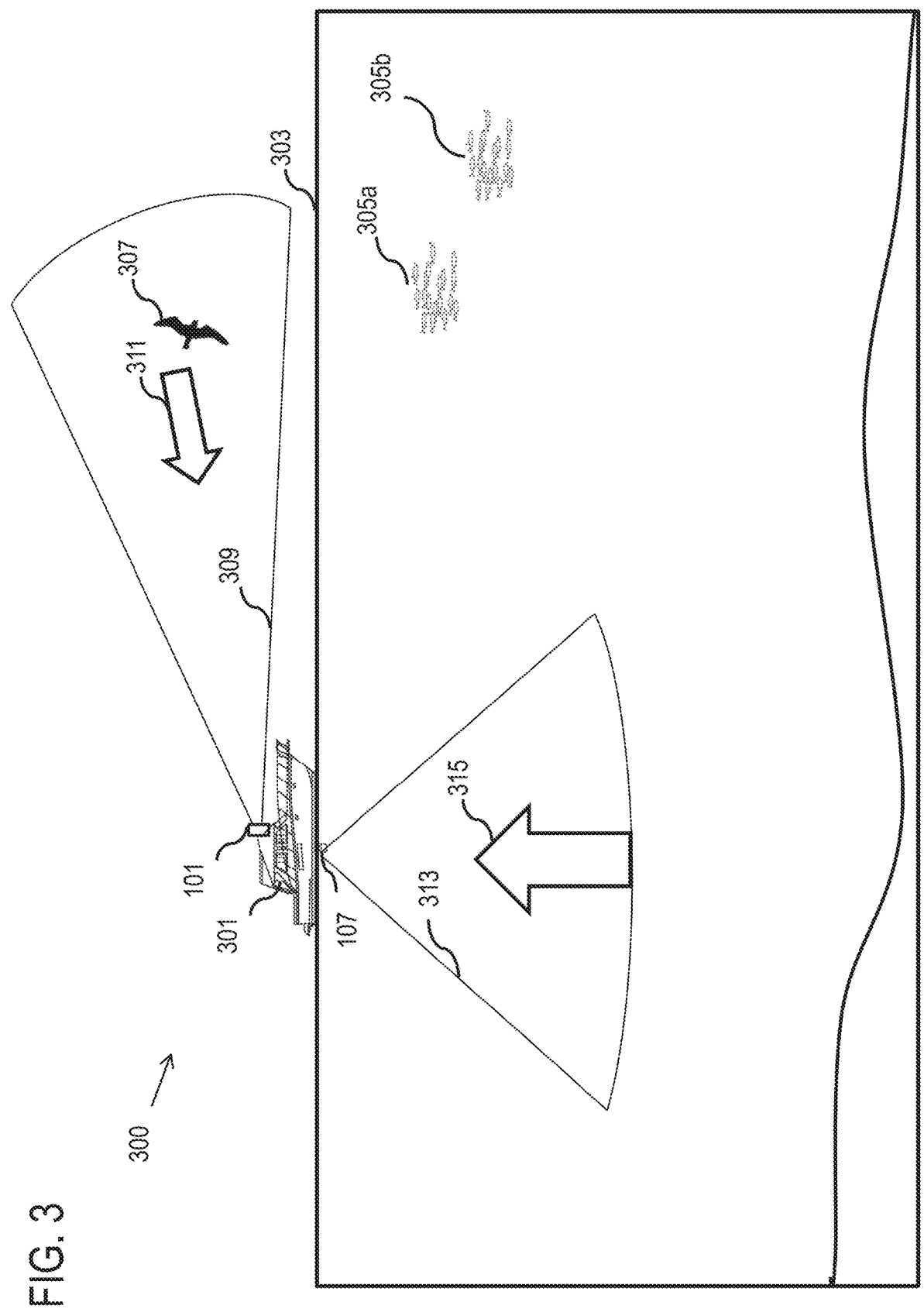
FIG. 3 illustrates an exemplary scenario where a vessel uses the system for detecting one or more schools of fish in a water body, in accordance with an example embodiment.

FIG. 3 illustrates a scenario 300 where a vessel 301 uses the system 101 for detecting the one or more schools of fish 305*a*, 305*b* in a water body 303, in accordance with an example embodiment. The vessel 301 in the water body 303 comprises the object detecting system 101 for detecting the one or more objects 305*a*, 305*b* or the like. One of the objectives of the present disclosure is to detect one or more school of fish such as 305*a*, 305*b* based on the detection of the seabird flying with the speed and in the direction of the tidal current of the water body 303. To that end, the object detection system 101 transmits radar signals 309 (or electromagnetic waves or radio waves above the surface of the water body 303) in a predetermined range. When the radar signals 309 come into contact with the at least one object 307 they are reflected or scattered in many directions. The radar signals that are reflected back (i.e., echoes) 311 towards the system 101 are the desirable ones. The echoes 311 are used by the system 101 to determine radar information associated with the detected at least one object 307.

The radar information associated with the detected at least one object 307 may comprise location information of the at least one object 307, speed of the at least one object 307, direction in which the at least one object 307 is moving, or the like.

The system 101 may transmit the radar signals 309 in a 360-degree circle above the surface of the water body 303. The system 101 detects bearing and range of echoing pulse that returns from significant surrounding objects to produce a map like display on a display unit (not shown in FIG. 3), where the map may display position (latitude and longitude) of the detected at least one object 307, speed and the direction of the detected at least one object 307, or the like.

Further, it is important to determine whether the detected at least one object 307 is moving with a speed that is the same as the speed of the tidal current and further, moving in a direction that is the same as that of the tidal current. Because when the detected at least one object is moving in the direction with the tidal current, it may be determined that the detected at least one object 307 is one or more seabirds chasing one or more school of fish 305a, 305b. Further, based on the speed and direction of the detected at least one object 307, a type of the detected at least one object 307 may be determined.

Thus, in order to determine whether the detected at least one object 307 is moving in the direction with the tidal current, the system 101 may obtain speed and direction of the tidal current and compare the speed and the direction of the detected at least one object 307 with the speed and the direction of the tidal current. Further, the system 101 categorizes the detected at least one object 307 into different types based on the speed and direction of the detected at least one object 307 and the speed and the direction of the tidal current. In an example embodiment, system 101 may obtain information associated with the tidal current directly from the database 111. In another embodiment, the vessel 301 may use the plurality of sensors 107 to determine the tidal current. In order to determine the tidal current, the vessel 301 may transmit 'pings' of sound (or ultrasound waves) 313 at a constant frequency through the water body 303. The vessel 301 may use the tidal current indicator to transmit the ultrasound waves. As the sound waves 313 travel, they bounce off particles suspended in the moving water, and reflect back as echoes 315 towards the plurality of sensors 107. Due to Doppler Effect, the frequency of the reflected wave 315 will be high or low depending on the particles moving either towards the vessel 301 or away from the vessel 301. The sound wave reflected by particles moving away from the instrument will have a lower frequency return and vice versa. The difference in frequency between the transmitted waves 313 and the frequency of the returning waves or echoes 315 is called the Doppler shift. Since the particles move at the same speed as the water that carries them, the Doppler shift is proportional to the speed of the water or current i.e., tidal current.

The type of the detected at least one object 307 is at least one of: a stationary object, an object moving with the same speed and in the same direction as that of the tidal current, or an object moving in a direction independent of the tidal current. The at least one object may comprise at least one seabird (as illustrated in the FIG. 3), where the seabird may be moving with the same speed and in the same direction as that of the tidal current. Therefore, the system 101 may determine that the seabird is chasing the schools of fish 305a, 305b or there is driftage on the sea surface. Further, the system 101 may detect stationary objects such as a lighthouse, or other objects which are not moving with the tidal current such as helicopters, planes, or other birds which are not chasing after the school of fish. In this way, based on the detected at least one object 307, the system 101 detects the one or more driftages or schools of fish such as 305a, 305b.

As used herein, at least one target may be a subset of the at least one objects that is of interest to the user and therefore the apparatus notifies the user of the at least one object classified as a target. Depending on the situation, the user may be interested in different subsets of objects and therefore may be notified of different subsets which are classified as targets. In an example embodiment, the at least one target is at least one type of object which may be differentiated from other types of objects.

Figure 4:
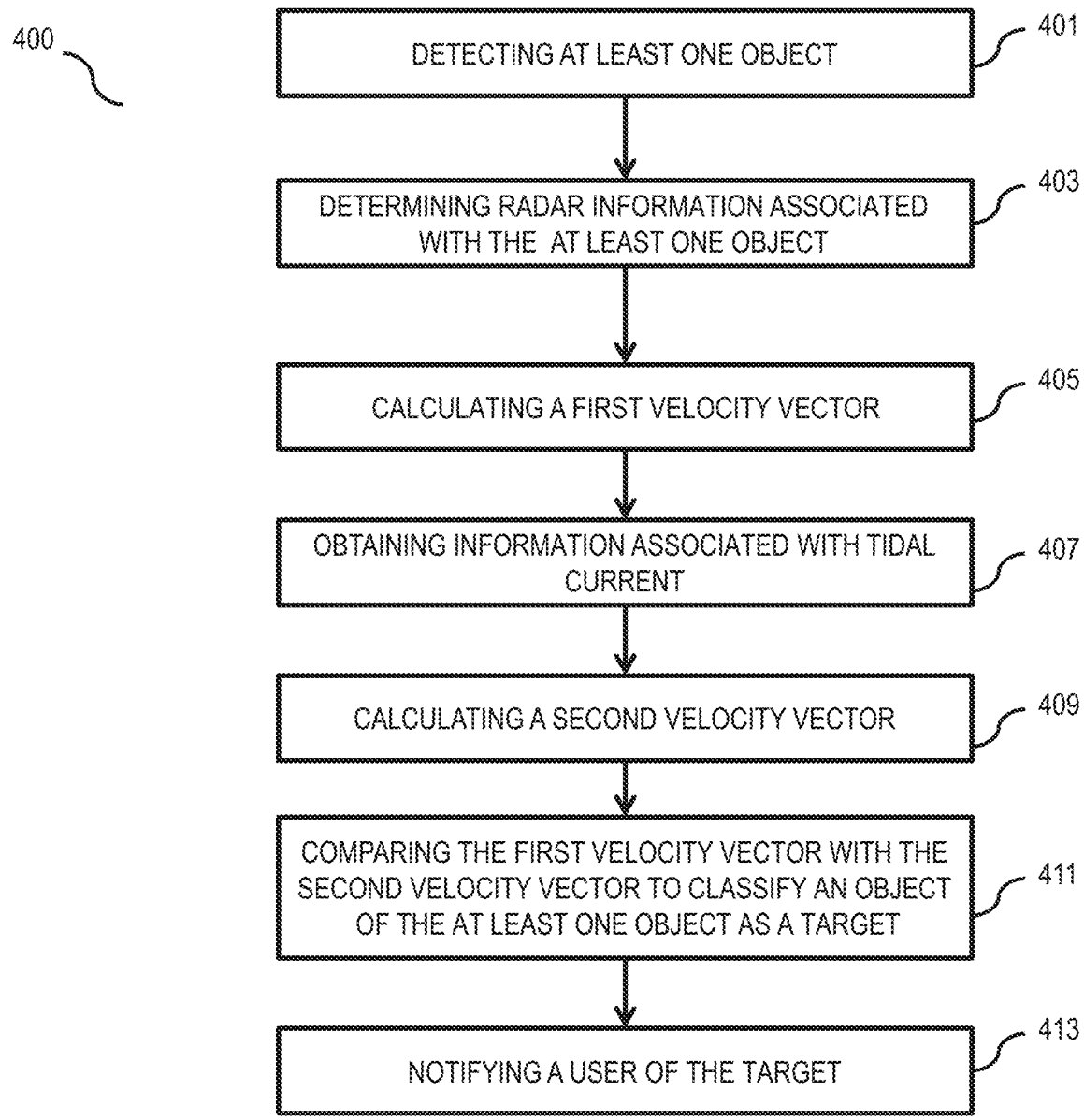
FIG. 4 is a flowchart that illustrates steps of a method executed by the apparatus for detecting the one or more objects in the water body, in accordance with an example embodiment.

FIG. 4 is a flowchart that illustrates steps of a method 400 executed by the system 101 for nautical tracking, in accordance with an example embodiment. The method 400 starts at step 401, where at least one object may be detected in or adjacent a water body. For detecting the at least one object, radio waves of high frequencies may be transmitted in air by a radar. The radio waves are reflected (i.e., echoes) by the at least one object. At step 403, echoes received from the at least one object may be used to determine radar information associated with the at least one object. The radar information associated with the at least one object may comprise speeds and directions of the at least one object.

At step 405, a first velocity vector associated with the detected at least one object may be calculated based on the radar information associated with the at least one object. The first velocity vector may comprise speed of the detected at least one object, distance at which the at least one object is detected, direction in which the detected at least one object is moving, or the like. At step 407, information associated with the tidal current may be obtained. The information associated with the tidal current may be obtained from the database 111. In another embodiment, the information associated with the tidal current may be obtained from the plurality of sensors 107 installed in the vessel. The information associated with a tidal current may comprise the speed and direction of the tidal current.

At step 409, a second velocity vector may be calculated based on the information associated with a tidal current of the water body. The second velocity vector may be determined by the navigation data management unit 123. The second velocity vector may comprise the direction in which the tidal current in flowing, speed of the tidal current, depth at which the speed of the tidal current is determined, or the like.

At step 411, the speed and direction associated with the at least one object may be compared with the speed and direction of the tidal current in order to classify an object of the at least one objects as a target. Similarly, an object in the water body not detected by the radar may be inferred to be present and classified as a target by the same process. In order to achieve this, the first velocity vector may be compared with the second velocity vector. Further, the different types of detected at least one object may be at least one of stationary objects, objects moving with the same speed and in the same direction as that of the tidal current, or objects moving in a direction independent of the tidal current. Based on the at least one object being detected as moving with the same speed and in the same direction as that of the tidal current, a location of an object in the water body such as a school of fish may be determined. This is because the at least one object moving with the same speed and in the same direction as that of the tidal current is determined to be one or more seabirds chasing the school of fish or be one or more driftage. Therefore, the school of fish is determined to be present in the water body at the location where the one or more seabirds are detected.

At step 413, the user 105 may be notified about the one or more objects detected or classified at step 411 as a target on a display screen of the user device 103. The notification may comprise the location of the detected one or more objects. Further, different types of the detected at least one object may be displayed on the display screen of the user device 103. The screen may display different types of the detected at least one object with different colors or frames in order to enable the user 105 to easily distinguish between different types of the detected at least one object.

Example embodiments of the present disclosure may thus provide for the system 101 and the apparatus that detects the one or more objects such as a school of fish in the water body based on the determination that the detected at least one object such as a group of seabirds are chasing the one or more objects (i.e., the school of fish). To that end, the apparatus determines whether the detected at least one object is a stationary object, an object moving with the same speed and in the same direction as that of the tidal current, or the objects moving in a direction independent of the tidal current. When the detected at least one object is determined to be moving with the same speed and in the same direction as that of the tidal current, the detected at least one object may be determined to be chasing the school of fish. Therefore, it is important for the user 105 such as a fisherman to detect such objects and further determine locations of these objects. Further, to determine whether the detected at least one object is chasing the school of fish or not, the apparatus first calculates the first velocity vector for the detected at least one object based on radar information associated with the detected at least one object. The apparatus further calculates the second velocity vector based on information associated with the tidal current. The apparatus then compares the first velocity vector and the second velocity vector in order to determine similarity between the two vectors. Based on the similarity the apparatus determines different types of the detected at least one object. The apparatus further displays different types of the detected at least one object with different colors or frames in order to enable the user 105 to visually distinguish between different types of the objects.

Further, based on the at least one object that is moving with the same speed and in the same direction as that of the tidal current, the apparatus determines the location of the one or more object (the school of fish). The objects moving in the direction with the tidal current are determined to be one or more seabirds chasing the school of fish or one or more driftages. Therefore, the one or more school of fish are determined to be present in the water body at the location of the detected at least one object moving along with the tidal current.

Many modifications and other embodiments of the inventions set forth herein will come to mind of one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Unless otherwise explicitly stated, numbers preceded by a term such as "approximately," "about," and "substantially" as used herein include the recited numbers, and also represent an amount close to the stated amount that still performs a desired function or achieves a desired result. For example, unless otherwise explicitly stated, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An apparatus for nautical tracking, the apparatus comprising:
   processing circuitry configured to:
      detect at least one flying object in or adjacent a water body by a radar;
      determine radar information associated with the at least one flying object;
      calculate a first velocity vector for the at least one flying object at a location, based on the radar information associated with the at least one flying object;
      obtain a speed and a direction of a tidal current at the location in the water body from a database storing the speed and the direction of the tidal current;
      calculate a second velocity vector representing a velocity of the tidal current at the location, based on the speed and the direction of the tidal current obtained from the database;
      compare the first velocity vector and the second velocity vector by determining a similarity value between the first velocity vector and the second velocity vector;
      classify the at least one flying object as a target based on the similarity value determined between the first velocity vector and the second velocity vector; and
      notify a user of the target.

2. The apparatus of claim 1, wherein the processing circuitry is further configured to display on a display, a mark associated with the target and that is moving along with the tidal current, based on the similarity value determined between the first velocity vector associated with the target and the second velocity vector.

3. The apparatus of claim 1,
   wherein the processing circuitry is further configured to determine a type of the at least one flying object, and
   wherein the type of the at least one flying object is at least one of a stationary object, a flying object moving with the tidal current, or a flying object moving in a direction independent of the tidal current.

4. The apparatus of claim 1, wherein the similarity value is determined based on at least one of:
   an inner product of the first velocity vector and the second velocity vector; and a difference between the first velocity vector and the second velocity vector.

5. The apparatus of claim 1, wherein the radar information associated with the at least one flying object comprises at least one of a speed of the at least one flying object and a direction in which the at least one flying object is moving.

6. The apparatus of claim 1, wherein the processing circuitry is further configured to:
generate one or more display signals associated with the at least one flying object; and
change the one or more display signals based on the similarity value determined between the first velocity vector associated with the at least one flying object and the second velocity vector associated with the tidal current.

7. The apparatus of claim 6, wherein the processing circuitry is further configured to use one or more colors for displaying the target based on the similarity value determined between the first velocity vector associated with the target and the second velocity vector.

8. The apparatus of claim 6, wherein the processing circuitry is further configured to change the one or more display signals based on a change in distance of the target.

9. A method for nautical tracking, the method comprising:
detecting, by a radar, at least one flying object in or adjacent a water body;
determining radar information associated with the at least one flying object;
calculating a first velocity vector for the at least one flying object at a location, based on the radar information associated with the at least one flying object;
obtaining a speed and a direction of a tidal current at the location in the water body from a database storing the speed and the direction of the tidal current;
calculating a second velocity vector representing a velocity of the tidal current at the location, based on the speed and the direction of the tidal current obtained from the database;
comparing the first velocity vector and the second velocity vector by determining a similarity value between the first velocity vector and the second velocity vector;
classifying the at least one flying object as a target based on the similarity value determined between the first velocity vector and the second velocity vector; and
notifying a user of the target.

10. The method of claim 9, wherein the method further comprises displaying on a display, a mark associated with the target and that is moving along with the tidal current, based on the similarity value determined between the first velocity vector associated with the target and the second velocity vector.

11. The method of claim 10, wherein the method further comprises:
generating one or more display signals associated with the at least one flying object; and
changing the one or more display signals based on the similarity value determined between the first velocity vector associated with the at least one flying object and the second velocity vector associated with the tidal current.

12. The method of claim 11, wherein the method further comprises using one or more colors for displaying the target based on the similarity value determined between the first velocity vector associated with the target and the second velocity vector.

13. The method of claim 11, wherein the method further comprises changing the one or more display signals based on a change in distance of the target.

14. The method of claim 9, wherein the method further comprises determining a type of the at least one flying object, and
wherein the type of the at least one flying object is at least one of a stationary flying object, a flying object moving in a direction with the tidal current, or a flying object moving in a direction independent of the tidal current.

15. The method of claim 9, wherein the similarity value is determined based on at least one of:
an inner product of the first velocity vector and the second velocity vector; and
a difference between the first velocity vector and the second velocity vector.

16. The method of claim 9, wherein the radar information associated with the at least one flying object comprises at least one of a speed of the at least one flying object and a direction in which the at least one flying object is moving.

17. A system for nautical tracking, the system comprising:
memory configured to store instructions; and
processing circuitry configured to execute the instructions to:
detect at least one flying object in or adjacent a water body by a radar;
determine radar information associated with the at least one flying object;
calculate a first velocity vector for the at least one flying object at a location, based on the radar information associated with the at least one flying object;
obtain a speed and a direction of a tidal current at the location in the water body from a database storing the speed and the direction of the tidal current;
calculate a second velocity vector representing a velocity of the tidal current at the location, based on the speed and the direction of the tidal current obtained from the database;
compare the first velocity vector and the second velocity vector by determining a similarity value between the first velocity vector and the second velocity vector;
classify the at least one flying object as a target based on the similarity value determined between the first velocity vector and the second velocity vector; and
notify a user of the target.

18. The system of claim 17, wherein the processing circuitry is further configured to display on a display, a mark associated with the target and that is moving along with the tidal current, based on the similarity value determined between the first velocity vector associated with the target and the second velocity vector.

* * * * *